United States Patent
Chimenti

(12) 
(10) Patent No.: US 6,745,926 B2
(45) Date of Patent: Jun. 8, 2004

(54) SECUREMENT ARRANGEMENT FOR A HITCH-MOUNT CARRIER

(75) Inventor: Thomas A. Chimenti, Fairfield, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 09/682,267

(22) Filed: Aug. 10, 2001

(65) Prior Publication Data

US 2002/0020728 A1 Feb. 21, 2002

Related U.S. Application Data

(60) Provisional application No. 60/224,288, filed on Aug. 10, 2000.

(51) Int. Cl.[7] ................................................. B60R 9/00
(52) U.S. Cl. ..................... 224/509; 224/495; 224/502; 224/510; 224/519; 224/924
(58) Field of Search ................... 224/509, 510, 224/502, 519, 532, 924, 521, 495

(56) References Cited

U.S. PATENT DOCUMENTS

| | | | | |
|---|---|---|---|---|
| 5,094,373 A | * | 3/1992 | Lovci ........................ 224/282 |
| 5,454,496 A | * | 10/1995 | Sumida et al. .............. 224/509 |
| 5,518,159 A | * | 5/1996 | DeGuevara ................. 224/282 |
| 5,664,717 A | * | 9/1997 | Joder ..................... 514/210.03 |
| 5,845,832 A | * | 12/1998 | Eichmann .................... 224/495 |
| 6,085,954 A | * | 7/2000 | Bloemer et al. ............ 224/502 |
| 6,123,498 A | * | 9/2000 | Surkin ........................ 224/509 |
| 6,199,735 B1 | * | 3/2001 | Cothern et al. ............. 224/509 |
| 6,237,823 B1 | * | 5/2001 | Stewart et al. .............. 224/282 |

* cited by examiner

*Primary Examiner*—Gregory Vidovich
*Assistant Examiner*—Maerena W. Brevard
(74) *Attorney, Agent, or Firm*—Novak Druee LLP

(57) ABSTRACT

Hitch mount load carrier including a stinger adapted to be stabbingly received in a hitch mount receiver of a carrying vehicle. A fixed upright post is stationarily coupled to the stinger, and an upright load supporting member is coupled to the fixed upright post by an expandable and contractable or swing-away linkage. A securement arrangement is adapted to releasably couple the upright load supporting member to the fixed upright post. The securement arrangement has a threaded receiver positioned upon the upright load supporting member at an aperture extending through at least a portion of the upright load supporting member. An elongate slot is positioned upon the fixed upright post and is configured to receive a threaded bolt therethrough. A threaded bolt is provided and configured to be insertible through the elongate slot and dimensioned to be vertically variably positionable in the elongate slot. An operator handle is connected to the threaded bolt for accommodating operator actuation of the securement arrangement.

25 Claims, 7 Drawing Sheets

SECUREMENT ARRANGEMENT FOR A HITCH-MOUNT CARRIER

CROSS REFERENCE TO RELATED APPLICATIONS

This patent application claims the benefit of U.S. Provisional Application No. 60/224,288 filed Aug. 10, 2000, entitled "Securement Arrangement for a Hitch-Mount Carrier"; the same is incorporated herein, in its entirety, by this reference.

BACKGROUND OF INVENTION

1. Technical Field

The present invention relates generally to load carriers. More specifically, the invention relates to hitch-mounted load carriers often referred to as being of the swing-away type.

2. Background of the Invention

The attachment of load carriers at rearward positions of transport vehicles, especially at hitch-mount receivers, is known, and particularly with respect to sports equipment carriers for bicycles and the like. Diamond-style extendible hitch mount carriers, as well as two-arm swing-away carriers, are varieties that are known in the load carrier industries. An example of such a diamond-style configuration is found in U.S. Pat. No. 6,085,954 issued to Bloemer for a Pivoting Extensible Rear Hitch Attachment for Equipment Carrier. Examples of such two-arm swing-away types of carriers are found in U.S. Pat. No. 5,664,717 issued to Joder for a Pivoting Sports Equipment Carrier and U.S. Pat. No. 5,454,496 issued to Sumida et al. for a Shiftable Load Carrier and Trailer Hitch Attachment.

From these examples, it may be appreciated that pivot linkages, and often multiple pivot linkages, can be employed to accommodate the extensible or swing-away feature of the carrier. A result of using the several linkages, however, is that a cumulative degree of looseness or "slop" is interposed into the overall carrier's structure. A consequence is that the upright load carrying component has a tendency to "bow down" away from the back of the carrying vehicle. The degree to which this occurs depends both on the nature of the pivot connection(s) and the load weight. Obviously, the greater the magnitude of the load and the degree of slop in the connection, the more the vertical orientation of the upright load supporting member will be allowed to bow down or tilt away from the back side of the carrying vehicle.

This tilted orientation often inhibits securement of the upright load supporting member to the stationary portion of the carrier, which is normally directly connected to the vehicle, for establishing a traveling mode of the carrier. This is particularly true if a fixed upright post is utilized off of the stationary portion of the carrier which is intended to be oriented substantially parallel to the upright load supporting member for releasable securement therebetween. In such a configuration, a fixed upright post is attached to the stinger portion of the carrier which is adapted for direct connection to the carrying vehicle's hitch receiver. Ideally, the fixed upright post would be located adjacent and parallel to the upright load supporting member in a traveling configuration. As a result, however, of the "bowing down" of the upright load supporting member away from the vehicle, and consequently away from the fixed upright post, those members are no longer substantially parallel and secured connection therebetween can be difficult, if not impossible.

In another aspect, some known diamond-style and/or swing-away hitch mount carriers provide an operator manipulatable handle for affecting securement and release of the upright load supporting member from the fixed upright post and this handle is positioned at the back side of the load carrier away from the carrying vehicle. A detrimental result of this arrangement is that the handle is oftentimes located amongst parts of the items, typically bicycles, that are mounted to that carrying member. This poses difficulty for the operator because the handle is not easily accessible because the wheels and tires of the forward-most bicycle; that is, the one nearest the vehicle are often positioned at substantially the same location as the handle.

This drawback is further enhanced by traditional configurations which attempt to place the handle as low as possible so that the point of connection between the fixed upright post and the upright load supporting member is as close as possible to the effective tilt axis between these two upright components; the logic being that the lower the connection, the more parallel and closely oriented the members will be to one another. For the user, however, this low position is usually inconvenient and uncomfortable which ultimately makes operation difficult.

In view of the above described deficiencies associated with diamond-style and two-arm swing-away type hitch mount carriers, the present invention has been developed to alleviate these drawbacks and provide further benefits to the user. These enhancements and benefits are described in greater detail hereinbelow with respect to several alternative embodiments of the present invention.

SUMMARY OF INVENTION

The present invention incorporates several features that minimize the disadvantages outlined above which are common both to known diamond-style extendible carriers and to known two-arm swing-away type carriers. Among them is a repositioning of the operator handle, as well as a reconfiguration of the securement arrangement between the two upright components of the carrier. Referring to the first aspect, the handled portion of the securement assembly is repositioned from the rearward side of the carrier to the forward side of the two upright members. This locates the handle in an area that is always clear and accessible because a fixed space is established between the backside of the carrying vehicle and the forward side of the load carrier, if by nothing else, by the length of the stinger which connects the carrier to the vehicle. The manner in which this buffer space is fixed and maintained will be defined in greater detail hereinbelow; but it should be appreciated that at a minimum, it is desired to avoid contact between carried items (bicycles) and the back of the carrying vehicle.

The securement assembly has been adapted so that misalignment (non-parallel orientation) between the two upright members does not affect the operation of the securement mechanism. Generally speaking, this is accomplished through the utilization of two accommodating features. The first of those two features is the provision of an aperture through the stationary upright member or post that is slotted. In this manner, the vertical position of a securement member such as a threaded bolt can be variable with respect to the fixed upright post. The elongate slotted configuration also accommodates deviations from horizontal of the long axis of the bolt. Such a deviation from horizontal can be required for proper alignment of the bolt with a threaded receiver, typically in the form of a nut or similarly interiorly threaded member. As shown, such a threaded receiver is provided in the upright load supporting member. As described above, the upright load supporting member is often "bowed down"

from a strict vertical orientation into a slightly tilted back position due to the utilization of the several pivot connections in the extensible or swing-away connection.

A further beneficial consequence of this adaptation to the securement arrangement is that the operator actuated handle no longer needs to be located so closely to the lower ends of the two uprights members where they are most proximate and parallelly oriented. This is a benefit to the user because one does not have to reach down so far to operate the handle of the securement mechanism; therefore, operation by the user is more comfortable and efficient.

As may be appreciated from the description above concerning the "bowing down" aspect of the upright load supporting member, the central axis of the nut carried in the upright post and with which the engaging bolt must be aligned may deviate from a strict horizontal and/or aligned orientation. Therefore, to avoid cross-threading, the long axis of the engaging bolt must be first properly aligned with the long axis of the nut to assure that threaded engagement is accomplished without detrimental cross-threading. Therefore, in addition to utilizing the slotted feature described above, the threaded bolt is specially selected to have a rounded nose, as well as a distal end region that is not threaded. Instead, the tip portion of the bolt has a smooth surface and is dimensioned to have an outer diameter just slightly less than the inner thread diameter of the nut. These features accommodate insertion of the leading smooth portion of the bolt as a guide into the nut for establishing proper alignment before thread engagement occurs with the trailing back region of the bolt. Of course, the opposite end of the bolt from the smoothed leading end carries the handle actuatable by the operator.

As intimated above, a complimentary feature of the present invention includes stops that are provided to prevent the carrier, in any configuration, from swinging sufficiently forward into positions that permit engagement of either the carrier or its load (bicycles) with the back of the carrying vehicle. This can be contrasted with existing diamond-style and/or swing-away type carriers in which such situations are permitted and damage can occur to either or both of the carrying vehicle and the carried items; even to the carrier itself if strikes are of sufficient magnitude.

The beneficial effects described above apply generally to the exemplary devices and mechanisms disclosed herein for a diamond-style hitch mount carrier. The specific structures through which these benefits are delivered will be described in detail hereinbelow.

BRIEF DESCRIPTION OF DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claim(s) and as a representative basis for teaching one skilled in the art to variously employ the present invention.

Figure 1:
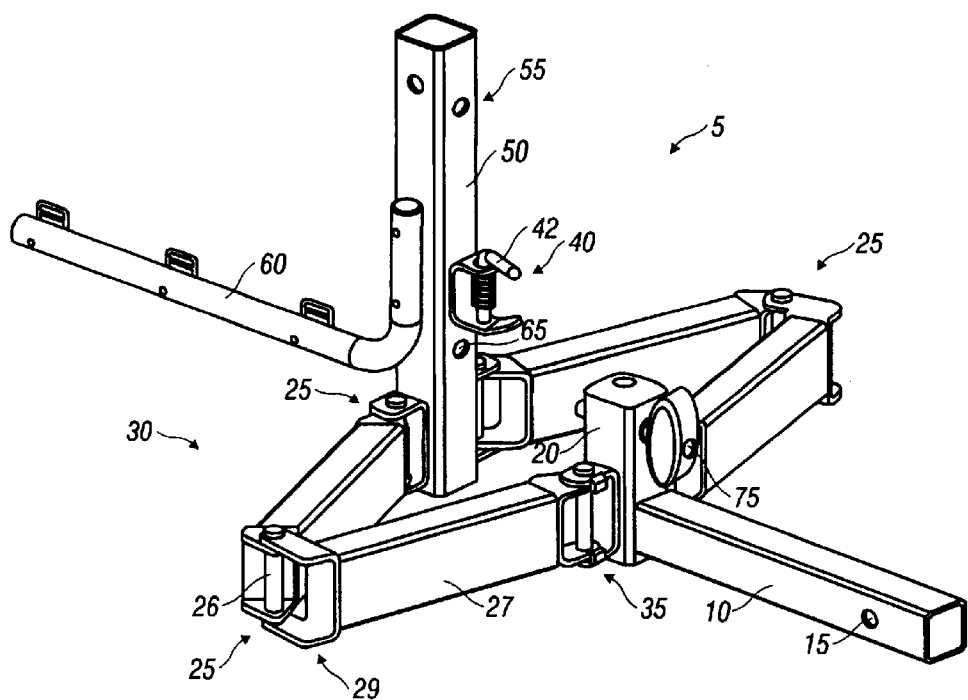
FIG. 1 is a perspective view of a diamond-style carrier in an expanded configuration constructed according to an embodiment of the present invention taken from a forward (from the carrying vehicle) position.

Referring to the Figures and using like reference numerals to identify like parts throughout the several views, FIG. 1 shows a diamond-style load carrier 05 adaptable for carrying such things as sports equipment, and particularly bicycles. It should be appreciated that in the illustrations only the lower portion of the carrier 05 is shown, including a stinger 10 configured to stab into a hitch receiver of a transporting vehicle (not shown). A pin receiver 15 is shown in the form of an aperture through the distal end of the stinger 10. By conventional design, the receiver 15 is adapted to accept a pin (not shown) that releasably connects the carrier 05 to the vehicle.

A fixed upright post 20 is permanently connected upon the stinger 10. An extensible connection 30 is provided between the fixed post 20 and an upright load supporting member 50. The connection 30 is of a diamond-style which expands, contracts, and swings from side-to-side for variably positioning a carried load, such as bicycles, with respect to the carrying vehicle. This configuration is often selected to give clearance space behind the transporting vehicle without unloading the carried cargo. A prime example is when it is desired to access the trunk or tailgated area of the vehicle, but not unload bicycles being carried on a hitch mount carrier.

The connection 30 includes six pivot connections 25. Four arms 27 are journaled between the pivot connections 25. Each of two ends of each arm 27 terminates in ears 29 utilized for establishing the pivot connection 25 between the arms 27 and pivot pins 26.

Load carrying arrangements (not shown) are typically mounted to the top end of the upright load supporting member 50 and secured at the receivers 55. As an example, bicycles may be exemplarily loaded thereupon and the owner will normally desire to secure those bicycles against sway during travel. To meet this need, an anti-sway anchor 60 is provided in the form of a L-shaped support to which securing straps can be easily connected.

Under the weight of a load, the carrier 05 will oftentimes naturally tend to an expanded configuration of the extensible connection 30. This is not always desired and therefore a convenient latching arrangement 40 is provided. The latch 40 is not intended to be a primary securement of the load for travel, but instead is provided as a light-weight latch configured to automatically engage when the traveling orientation is assumed. The automatic nature of the latching arrangement 40 is facilitated by a compression spring 43 which urges a lower pin-portion of a latching member 42 into a latched receiver 45 which takes the form of a depression, aperture or other suitable configuration for catching the latch member's 42 tip. Engagement of the latching member 42 into the receiver 45 is facilitated by the convex configuration of the top end of the upright post 20 and the upturned guide 44 of the latching arrangement 40.

An advantage of the diamond-style extensible connection 30 is its facilitation of wide range and continuously variable positioning of not only the load carrier, but also the load being transported thereupon with respect to the carrying vehicle. A potential drawback to this configuration, however, is that the connection 30, if not restrained, can permit forward movement of the aft portion of the carrier to an extent that either the carrier 05 or the load positioned thereupon strikes the transporting vehicle. This is undesired in that damage may result to either or both of the engaging items.

Remedially, stops 35 are provided to prevent the components of the carrier 05 positioned rearwardly of the stinger 10 from moving more forward than the post's 20 position. As illustrated in FIG. 1, the stops 35 take the form of opposed projections arranged to engage and stop the ears 29 of approaching arms 27 from further rotation. In this manner the moveable portions of the carrier 05 are effectively prevented from moving forward of the fixed upright post 20 and resultingly, damage is avoided that would otherwise be caused by strikes between the carried load and transporting vehicle.

Figure 2:
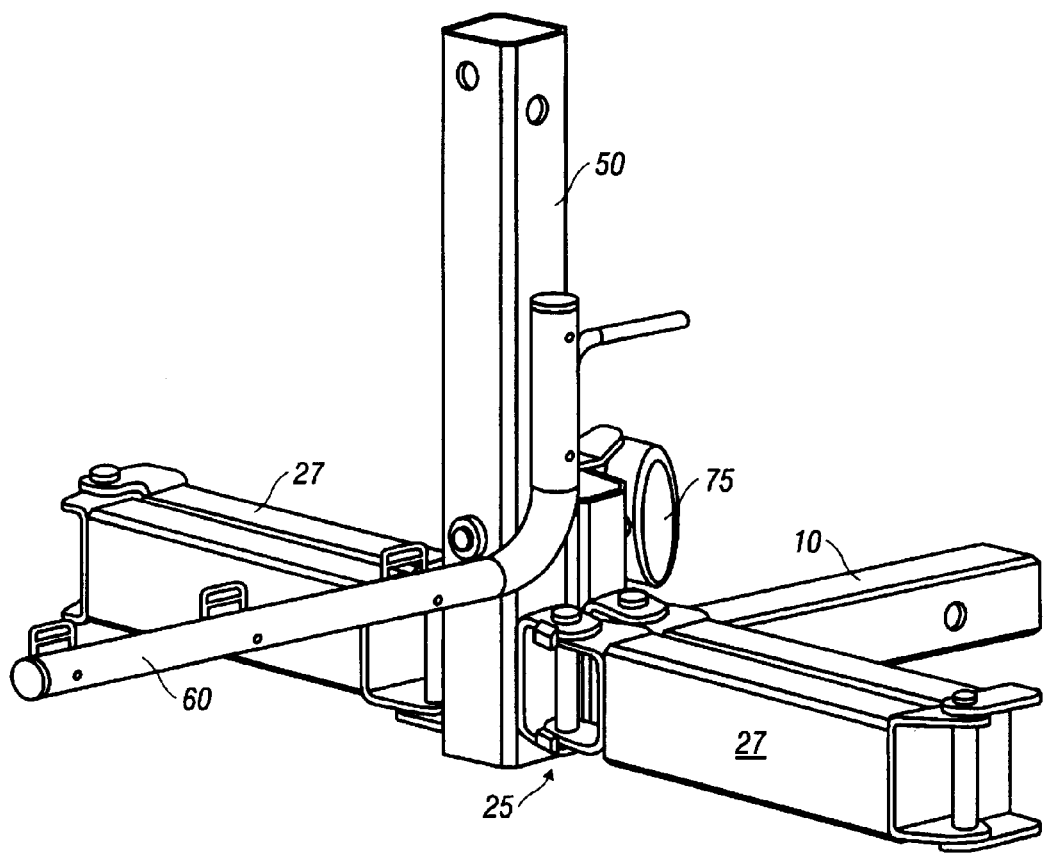
FIG. 2 is a perspective view of the carrier of FIG. 1 in a secured traveling configuration taken from a rearward (toward the carrying vehicle) position.
Figure 3:
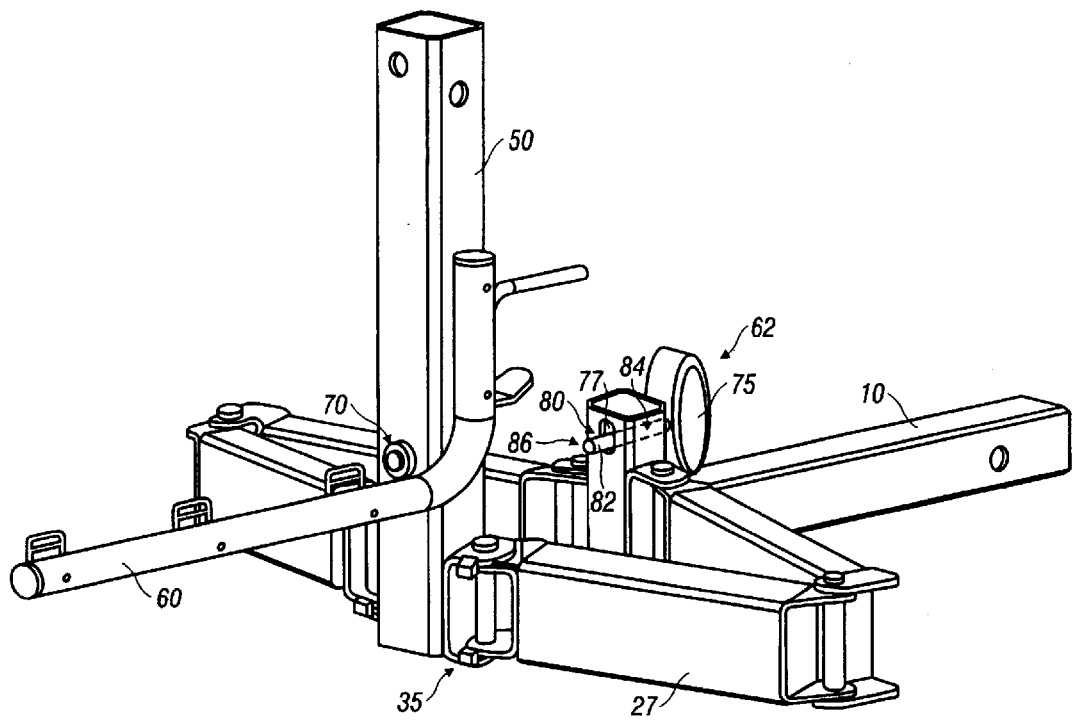
FIG. 3 is a perspective view of the carrier of FIG. 2 in an expanded configuration.
Figure 4:
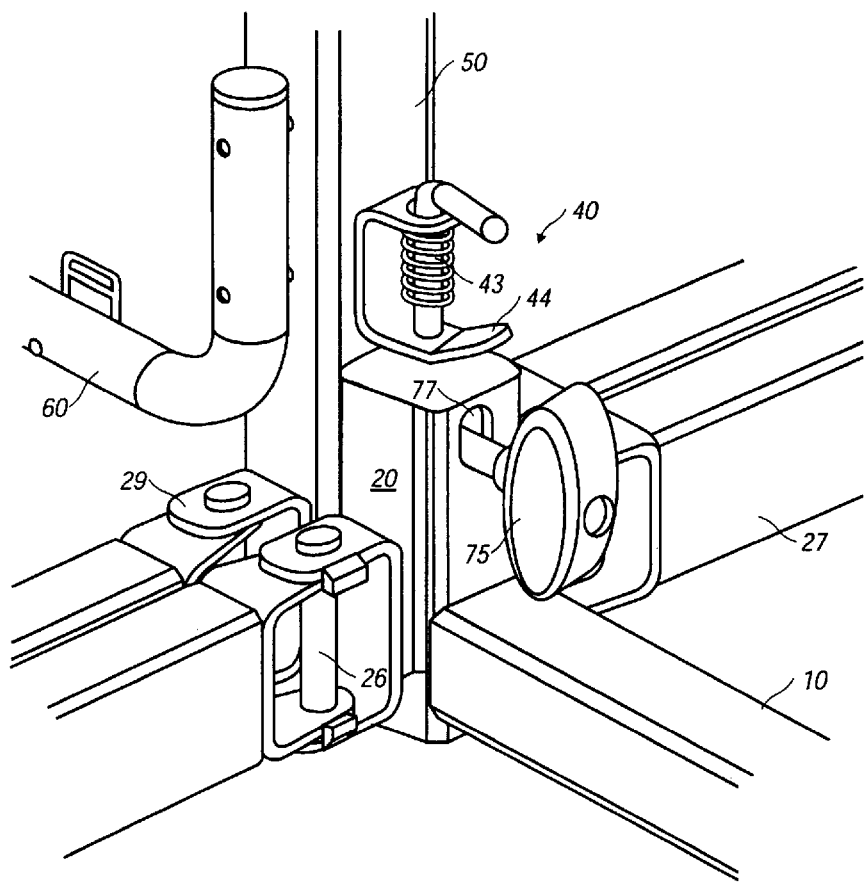
FIG. 4 is a perspective view of the carrier of FIG. 1 showing in greater detail the securement arrangement.

Referring to FIGS. 2, 3, and 4, a securement arrangement 62, as shown in FIG. 3, may be appreciated that is utilized to fix the diamond-style load carrier 05 in a transporting or traveling configuration, as shown in FIG. 2, with the connection 30 in a contracted orientation. Associated with, and piercing the fixed upright post 20, is a pair of elongate slots 77. A long axis of each slot 77 is oriented substantially vertically in the side walls of the post 20. A bolt 80 is inserted thereacross and into a receiving aperture 65 piercing a wall of the upright load supporting member 50. A distal tip 86 of the bolt 80 ultimately lands in a threaded receiver 70, typically taking the form of a conventional nut 70. An operator handle 75 is located at the head end of the bolt 80. The handle 75 is configured to be easily grasped and turned by an operator. This grasping and turning operation is utilized to secure and disengage the upright load supporting member 50 to and from the post 20.

As described hereinabove, the diamond-style extensible connection 30 has sufficient slack in the pivot connections 25 that the upright load supporting member 50 is permitted to tilt away from a strict vertical orientation. As a result, the long axis of the threaded receiver 70, which is connected upon the member 50, is moved correspondingly away from a horizontal orientation. The slots 77 are provided so that a long axis of the bolt 80 can be commensurately offset from the horizontal for aligned engagement with the threaded receiver 70.

To further enhance the likelihood of aligned engagement between the bolt 80 and the nut 70, the bolt 80 is specially selected, or configured, so that the distal end of the bolt 80 terminates in a rounded tip 86, has a smooth region 82 extending directly behind the rounded tip 86 and ultimately transitions into a threaded region 84 which may or may not continue up to the handle 75. Through this configuration, the bolt 80 can be an initially inserted into an interior space of the threaded receiver 70 and properly aligned before threaded engagement begins. The rounded tip 86 provides the first facilitation that targets the bolt 80 into the interior of the threaded receiver 70. The smooth region 82 extending behind the tip 86 is sized so that an outer diameter of that cylindrical region substantially conforms to an interior diameter of the threads of the nut 70. In this manner, the long axis of the nut is aligned substantially coincident with the long axis of the bolt before threaded engagement occurs as the threaded region 84 of the bolt 80 progresses rotatingly into the threads of the receiver 70 under the operator's influence.

Because of the accommodation enabled by the slot 77, a readily appreciable equivalent of which is an expanded aperture having a sufficiently greater cross-sectional area that the bolt 80, at least in the dimension corresponding to the long-axis of the slot 77, it is not necessary that the bolt 80 be strictly horizontally oriented for engagement with the nut 70. But instead, the bolt 80 can be offset from the horizontal to be properly aligned with the nut 70 which has tilted together with the upright load supporting member.

Figure 5:
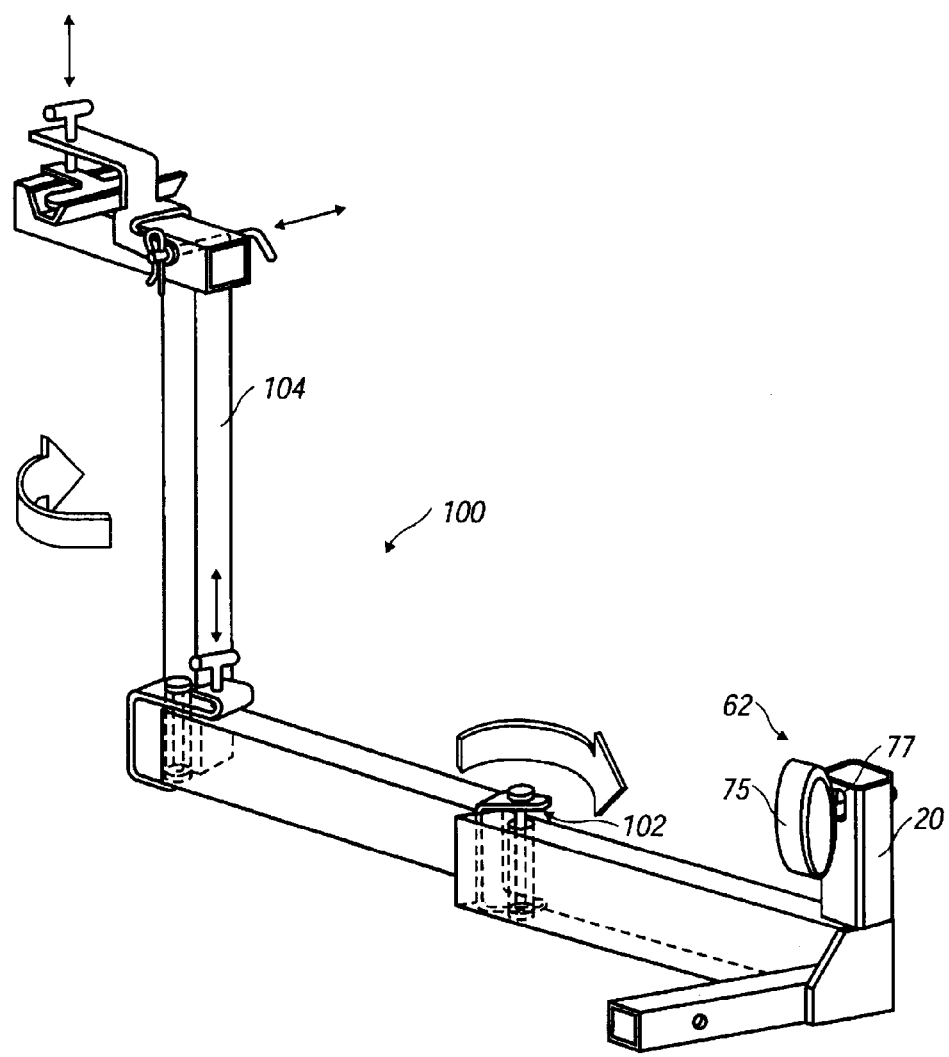
FIG. 5 is a perspective view of a two-arm swing-away type carrier in an expanded configuration and having a securement arrangement configured according to the teachings of the present invention.
Figure 6:
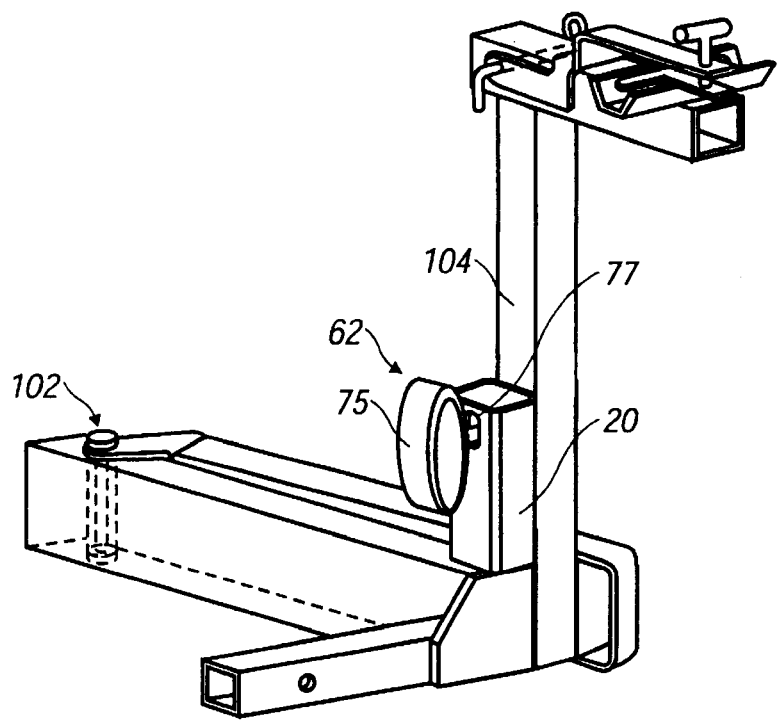
FIG. 6 is a perspective view of the two-arm swing-away type carrier of FIG. 5 in a secured traveling configuration taken from a forward (from the carrying vehicle) position.
Figure 7:
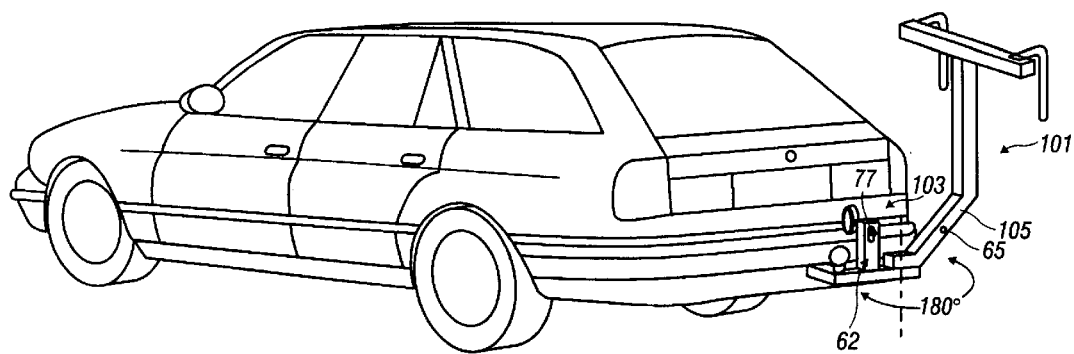
FIG. 7 is a perspective view of another two-arm swing-away type carrier in an expanded configuration constructed according to an embodiment of the present invention taken from a rearward (toward the carrying vehicle) position.

Referring to FIGS. 5, 6, and 7, examples of two-arm swing-away type load carriers 100, 101 are shown. Likewise, the connection of two-arm swing-away type load carriers 100, 101 has sufficient slack in the pivot connection 102, 103 that the upright load supporting member 104, 105 is permitted to tilt away from a strict vertical orientation. In another aspect of an embodiment of the present invention, in order to fix the swing-away type load carrier 100, 101 in a transporting or traveling configuration, the same securement arrangement 62 as shown, for example, in FIG. 3, with the elongate slots 77 that receive the bolt 80 having the operator handle 75 can also be utilized with the two-arm swing-away type load carrier 100, 101 as illustrated.

A securement arrangement for a hitch-mounted carrier, such as a diamond-style 05 or swing-away type load carrier 100, 101, having unique and beneficial features has been described herein. These and other variations which will be appreciated by those skilled in the art are considered to be within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A hitch mount load carrier comprising:
   a stinger adapted to be stabbingly received in a hitch mount receiver of a carrying vehicle;
   a fixed upright post stationarily coupled to said stinger;
   an upright load supporting member coupled to said fixed upright post by a pivotable linkage; and
   a securement arrangement adapted to releasably couple said upright load supporting member to said fixed upright post, said securement arrangement comprising:
      a threaded receiver positioned upon said upright load supporting member at an aperture extending through at least a portion of said upright load supporting member;
      a pair of elongate slots positioned upon and piercing the fixed upright post;
      a threaded bolt configured to be insertable through said pair of elongate slots and dimensioned to be variably positionable in said elongate slots; and
      an operator handle connected to said threaded bolt for accommodating operator actuation of said securement arrangement.

2. The hitch mount load carrier of claim 1, wherein each of the elongate slots has a long axis oriented substantially vertically in a side wall of the fixed upright post.

3. The hitch mount load carrier of claim 1, wherein the threaded bolt is provided with a rounded nose and an unthreaded distal end region adapted to be received by the threaded receiver.

4. The hitch mount load carrier of claim 3, wherein the unthreaded distal end region of the threaded bolt transitions into a threaded region configured to threadably engage the threaded receiver.

5. The hitch mount load carrier of claim 4, wherein the unthreaded distal end region of the threaded bolt is dimensioned to have an outer diameter slightly less than an inner thread diameter of the threaded receiver.

6. The hitch mount load carrier of claim 1, wherein the threaded bolt is configured to be insertable through said elongate slot with the operator handle disposed on a side of the fixed upright post toward the stinger.

7. The hitch mount load carrier of claim 6, wherein the operator handle is located at a head end of the threaded bolt opposite a rounded nose end of the threaded bolt.

8. The hitch mount load carrier of claim 1, wherein the upright load supporting member is coupled to said fixed upright post by a diamond-style pivotable linkage.

9. The hitch mount load carrier of claim 8, wherein the diamond-style pivotable linkage is provided with linkage stops configured to limit swinging motion of the upright load supporting member toward the carrying vehicle.

10. The hitch mount load carrier of claim 9, wherein the linkage stops are configured to limit swinging motion of the upright load supporting member beyond the fixed upright post toward the carrying vehicle.

11. The hitch mount load carrier of claim 10, wherein the linkage stops further comprise opposed projections arranged to engage ears of converging arms of the diamond-style pivotable linkage to limit rotation of the converging arms.

12. A hitch mount load carrier comprising:
 a stinger adapted to be stabbingly received in a hitch mount receiver of a carrying vehicle;
 a fixed upright post stationarily coupled to said stinger;
 an upright load supporting member coupled to said fixed upright post by a pivotable linkage; and
 a securement arrangement adapted to releasably couple said upright load supporting member to said fixed upright post, said securement arrangement comprising:
  a threaded receiver positioned upon said upright load supporting member at an aperture extending through at least a portion of said upright load supporting member;
  an elongate slot positioned upon said fixed upright post, said elongate slot configured to receive a threaded bolt therethrough;
  a threaded bolt configured to be insertable through said elongate slot and dimensioned to be variably positionable in said elongate slot; and
  an operator handle connected to said threaded bolt for accommodating operator actuation of said securement arrangement;
 wherein the upright load supporting member is coupled to said fixed upright post by a two-arm swing-away type pivotable linkage.

13. A load carrier arrangement comprising:
 a hitch mount load carrier having a stationary member couplable to a carrying vehicle;
 an upright load supporting member pivotally coupled to said stationary member and configured to be releasably coupled to said stationary member in a transporting configuration and to be moved away from said stationary member in an extended configuration; and
 a securement arrangement adapted to accomplish a connection between said stationary member and said upright load supporting member in said transporting configuration, said securement arrangement including a rotatable handle positioned at a vehicle-side of said stationary member, and a threaded securing element extending across said stationary member through at least two elongate apertures in said stationary member for engagement with the upright load supporting member.

14. The load carrier arrangement as recited in claim 13, further comprising:
 said securement arrangement positioned proximate a top end of said stationary member thereby facilitating a user's comfortable grasp and actuation of said rotatable handle when said load carrier arrangement is installed upon a carrying vehicle.

15. The load carrier arrangement as recited in claim 13, wherein said upright load supporting member is coupled to said stationary member by a diamond-style pivotable linkage.

16. The load carrier arrangement as recited in claim 15, wherein said diamond-style pivotable linkage is provided with linkage stops configured to limit swinging motion of said upright load supporting member toward the carrying vehicle.

17. The load carrier arrangement as recited in claim 16, wherein said linkage stops are configured to limit swinging motion of said upright load supporting member beyond said stationary member toward the carrying vehicle.

18. The load carrier arrangement as recited in claim 17, wherein said linkage stops further comprise opposed projections arranged to engage ears of converging arms of said diamond-style pivotable linkage to limit rotation of said converging arms.

19. The load carrier arrangement as recited in claim 13, wherein said upright load supporting member is coupled to said stationary member by a two-arm swing-away type pivotable linkage.

20. The load carrier arrangement as recited in claim 13, further comprising:
 a secondary latching arrangement configured to fasten said stationary member and said upright load supporting member together in the transporting configuration thereby providing at least partial redundancy to said securement arrangement.

21. The load carrier arrangement as recited in claim 20, wherein said secondary latching arrangement includes an upturned guide configured to present a ramped surface that facilitates proper positioning of said stationary member and said upright load supporting member when coming together in the transporting configuration.

22. The load carrier arrangement as recited in claim 20, wherein said secondary latching arrangement includes a latching member having a pin-portion that is insertibly and releasably received in a latch receiver in the transporting configuration.

23. The load carrier arrangement as recited in claim 22, wherein said latching member is spring-biased toward a latching configuration thereby enabling automatic engagement of said latching member when said stationary member and said upright load supporting member come together in the transporting configuration.

24. A hitch mount load carrier comprising:
a stinger adapted to be stabbingly received in a hitch mount receiver of a carrying vehicle;
a fixed upright post stationarily coupled to said stinger;
an upright load supporting member coupled to said fixed upright post by a pivotable linkage; and
a securement arrangement adapted to releasably couple said upright load supporting member to said fixed upright post, said securement arrangement comprising:
 a threaded receiver positioned upon said upright load supporting member at an aperture extending through at least a portion of said upright load supporting member;
 an elongate slot positioned upon said fixed upright post, said elongate slot configured to receive a threaded bolt therethrough;
 a threaded bolt configured to be insertable through said elongate slot and dimensioned to be variably positionable in said elongate slot; and
 an operator handle connected to said threaded bolt for accommodating operator actuation of said securement arrangement;
 wherein said fixed upright post is stationarily coupled to said stinger.

25. A hitch mount load carrier comprising:
a stinger adapted to be stabbingly received in a hitch mount receiver of a carrying vehicle;
a fixed upright post stationarily coupled to said stinger;
an upright load supporting member coupled to said fixed upright post by a pivotable linkage; and
a securement arrangement adapted to releasably couple said upright load supporting member to said fixed upright post, said securement arrangement comprising:
 a threaded receiver positioned upon said upright load supporting member at an aperture extending through at least a portion of said upright load supporting member;
 an elongate slot positioned upon said fixed upright post, said elongate slot configured to receive a threaded bolt therethrough;
 a threaded bolt configured to be insertable through said elongate slot and dimensioned to be variably positionable in said elongate slot; and
 an operator handle connected to said threaded bolt for accommodating operator actuation of said securement arrangement;
 wherein said fixed upright post is stationarily coupled to said pivotable linkage.

\* \* \* \* \*